(12) United States Patent
Mital et al.

(10) Patent No.: US 12,492,961 B2
(45) Date of Patent: Dec. 9, 2025

(54) ACOUSTIC EMISSIONS MONITORING OF HIGH PRESSURE SYSTEMS

(71) Applicant: Flow International Corporation, Kent, WA (US)

(72) Inventors: Greg Mital, Tacoma, WA (US); Sean Schramm, Buckley, WA (US)

(73) Assignee: Flow International Corporation, Kent, WA (US)

( * ) Notice: Subject to any disclaimer, the term of this patent is extended or adjusted under 35 U.S.C. 154(b) by 371 days.

(21) Appl. No.: 17/967,729

(22) Filed: Oct. 17, 2022

(65) Prior Publication Data

US 2023/0038473 A1    Feb. 9, 2023

Related U.S. Application Data

(62) Division of application No. 16/569,365, filed on Sep. 12, 2019, now Pat. No. 11,519,812.

(51) Int. Cl.
    *G01M 3/24*    (2006.01)
    *F17D 5/06*    (2006.01)
    *G01M 3/28*    (2006.01)

(52) U.S. Cl.
    CPC ............ *G01M 3/24* (2013.01); *F17D 5/06* (2013.01); *G01M 3/28* (2013.01)

(58) Field of Classification Search
    None
    See application file for complete search history.

(56) References Cited

U.S. PATENT DOCUMENTS

| | | | |
|---|---|---|---|
| 5,341,670 A * | 8/1994 | Brook | G01M 3/24 73/592 |
| 5,708,195 A | 1/1998 | Kurisu et al. | |
| 6,092,370 A | 7/2000 | Tremoulet et al. | |
| 9,163,617 B2 * | 10/2015 | Mann | F04B 53/02 |
| 2004/0079158 A1 | 4/2004 | Mercer | |
| 2007/0095138 A1 | 5/2007 | El-Bakry et al. | |
| 2008/0006088 A1 * | 1/2008 | Wago | G01M 3/24 417/63 |
| 2009/0211341 A1 * | 8/2009 | Witt | F04B 53/164 417/474 |
| 2011/0093220 A1 * | 4/2011 | Yang | G01M 3/36 702/51 |

(Continued)

FOREIGN PATENT DOCUMENTS

| | | |
|---|---|---|
| CN | 106287240 B | 10/2018 |
| CN | 108980638 A | 12/2018 |

(Continued)

OTHER PUBLICATIONS

International Search Report and Written Opinion for PCT/US2020/050553, mailed Dec. 18, 2020, 11 pages.

*Primary Examiner* — Mark A Shabman
(74) *Attorney, Agent, or Firm* — Cozen O'Connor

(57) ABSTRACT

Disclosed herein are components, systems, and methods to monitor acoustic emissions of a high pressure system to predict failure of the high pressure system. Further disclosed herein are components, systems, and methods to monitor acoustic emissions of a high pressure system to identify characteristics of one or more defects as they form and grow within components of the high pressure system. Characteristics of the defects include type, size, growth, and location.

20 Claims, 6 Drawing Sheets

(56) References Cited

U.S. PATENT DOCUMENTS

| | | | |
|---|---|---|---|
| 2014/0260572 A1* | 9/2014 | Mayer | G01M 15/14 |
| | | | 73/431 |
| 2015/0028507 A1* | 1/2015 | Kukla | G01N 29/14 |
| | | | 425/135 |
| 2015/0251331 A1 | 9/2015 | Vandergon et al. | |
| 2015/0300907 A1 | 10/2015 | Giunta et al. | |
| 2016/0298614 A1* | 10/2016 | Gaillard | F04B 9/113 |
| 2018/0045597 A1 | 2/2018 | Farnsworth et al. | |
| 2019/0145851 A1 | 5/2019 | Hilpert et al. | |
| 2019/0277722 A1 | 9/2019 | Cole | |

FOREIGN PATENT DOCUMENTS

| | | |
|---|---|---|
| CN | 109087720 A | 12/2018 |
| CN | 109469837 A | 3/2019 |
| CN | 109654384 A | 4/2019 |
| WO | 2017203279 A1 | 11/2017 |
| WO | 2018133494 A1 | 7/2018 |

* cited by examiner

US 12,492,961 B2

ACOUSTIC EMISSIONS MONITORING OF HIGH PRESSURE SYSTEMS

CROSS REFERENCE TO RELATED APPLICATION

This application is a division of application Ser. No. 16/569,365, filed Sep. 12, 2019, which is incorporated by reference, in its entirety.

BACKGROUND

Technical Field

This disclosure relates to maintenance and operation of high-pressure fluid systems and related methods, and more particularly, to acoustic emissions monitoring to predict and detect failure of components within a high pressure system.

Description of the Related Art

Operation of high pressure systems results in eventual failure of components of those systems. For example, the pumps used to create the high pressure environment include cylinders, check valves, and seals, among other components, which are subjected to rapid cycling. Failure of one or more components of the high pressure system usually requires a system shutdown to repair or replace the failed component.

Component failures in high pressure systems are often sudden. These types of sudden failure can result in the loss of a workpiece that was in progress when the failure occurred. This can lead to many lost hours of work. Additionally, sudden shutdowns may result in additional damage to the high pressure system that could be avoided if the failing component was replaced during a scheduled maintenance window.

To compensate for this, service intervals for components of a high pressure system are typically conservative, for example replacing a cylinder after 500 hours of use even if the cylinder has not yet failed. While this conservative scheduling can allow for an end user to plan around the maintenance, it usually leaves component life "on the table."

BRIEF SUMMARY

Embodiments described herein provide systems and methods of monitoring high pressure systems, for example ultra-high pressure systems, using acoustic emissions to monitor and predict failure of components within the high pressure systems.

According to one embodiment, a method of operating a high pressure system includes detecting at least one acoustic emission generated by a defect in a component of the high pressure system, wherein the at least one acoustic emission is detected by an acoustic sensor attached to the high pressure system. The method further includes processing a signal sent from the acoustic sensor in response to the at least one acoustic emission thereby generating a processed signal, analyzing the processed signal; and predicting failure of the high pressure system based at least in part on the analysis of the processed signal.

Additional embodiments described herein provide a method of performing maintenance on a high pressure system, the method including detecting a first acoustic emission generated by the high pressure system at a first time, and processing the first acoustic emission to establish a baseline. The method further includes, subsequent to detecting the first acoustic emission, detecting a second acoustic emission generated by the high pressure system at a second time, processing the second acoustic emission to establish a current data set, and comparing the baseline to the current data set to determine if a defect occurred in the high pressure system between the first time and the second time.

Additional embodiments described herein provide a high pressure system including a plunger, a drive chamber, a high pressure chamber, an end bell assembly, and at least one acoustic sensor. The plunger has a first surface with a first surface area, and a second surface with a second surface area that is smaller than the first surface area. The drive chamber encloses the plunger such that the first surface is translatable within the drive chamber, relative to the drive chamber, and along a first direction normal to the first surface. The high pressure chamber encloses the plunger such that the second surface is translatable within the high pressure chamber, relative to the high pressure chamber, and along the first direction, the high pressure chamber including a first end and a second end, the second end opposite the first end. The end bell assembly couples the first end of the high pressure chamber to the drive chamber, and the at least one acoustic sensor is attached to at least one of the drive chamber, the high pressure chamber, and the end bell assembly.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
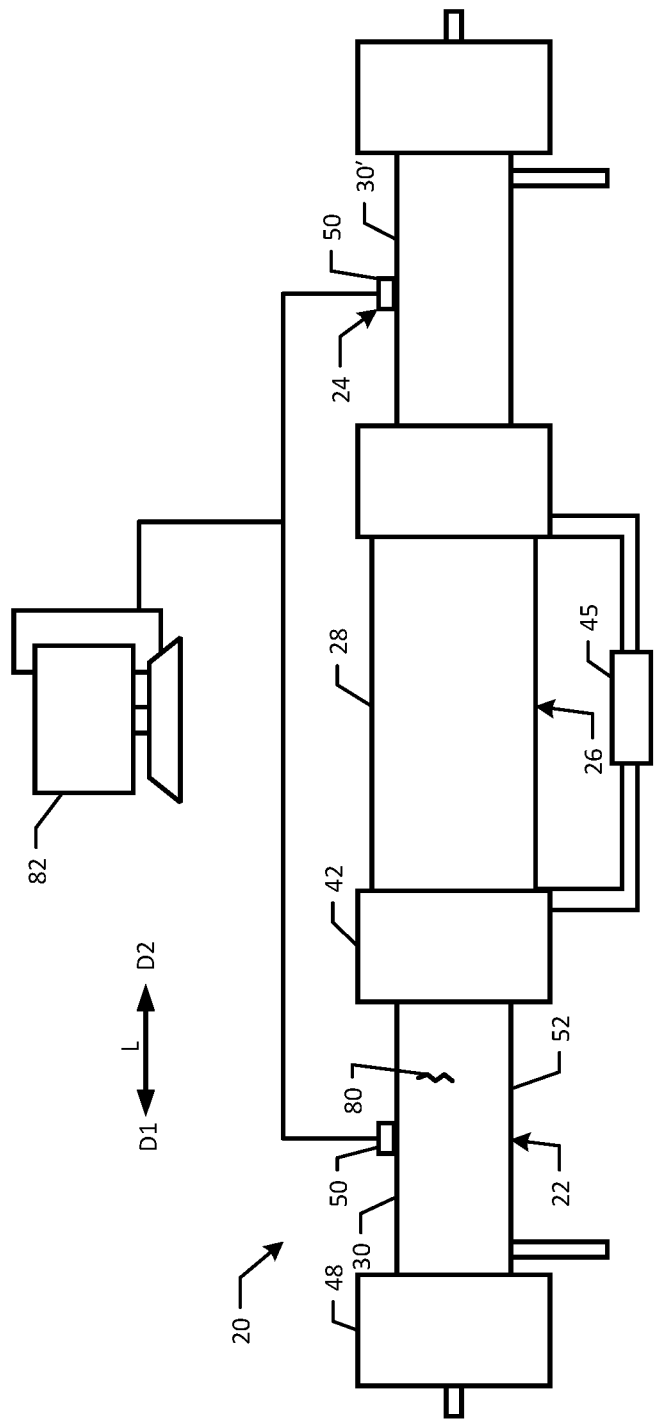
FIG. 1 is a side, elevation view of a high pressure system with acoustic emission monitoring, according to one embodiment.

In the following description, certain specific details are set forth to provide a thorough understanding of various disclosed embodiments. However, one of ordinary skill in the relevant art will recognize that embodiments may be practiced without one or more of these specific details, or with other methods, components, materials, etc. In other instances, well-known structures associated with high-pressure water systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Figure 2:
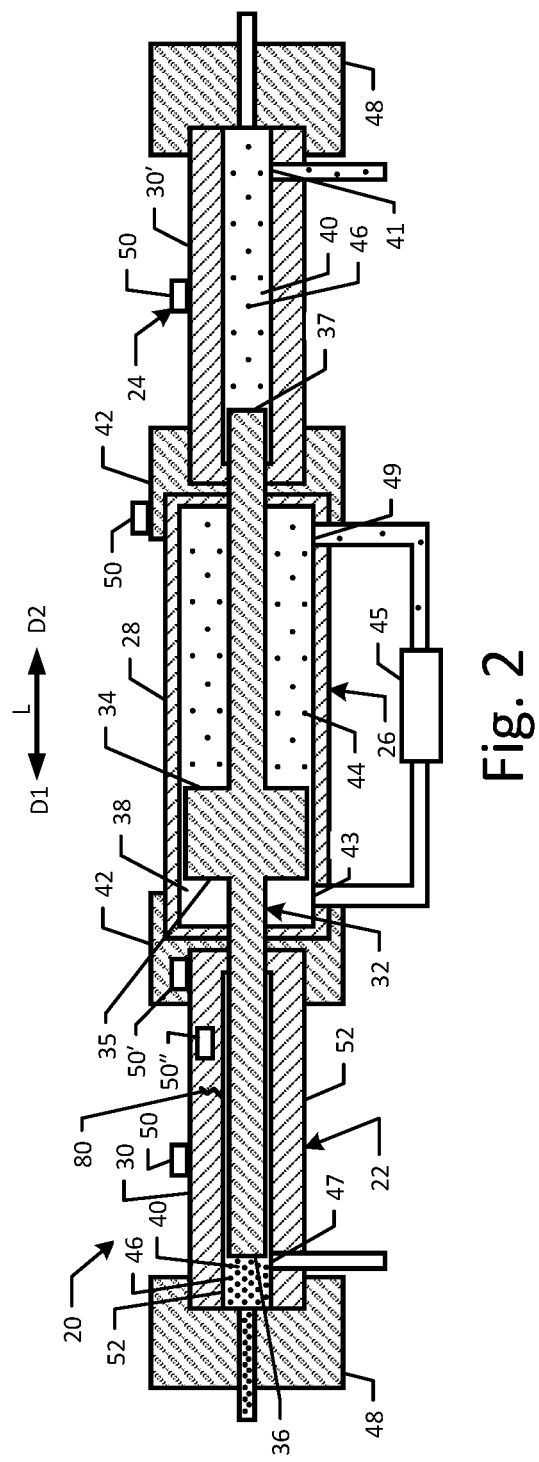
FIG. 2 is a side, cross-sectional view of the high pressure system with acoustic emission monitoring illustrated in FIG. 1.
Figure 3:
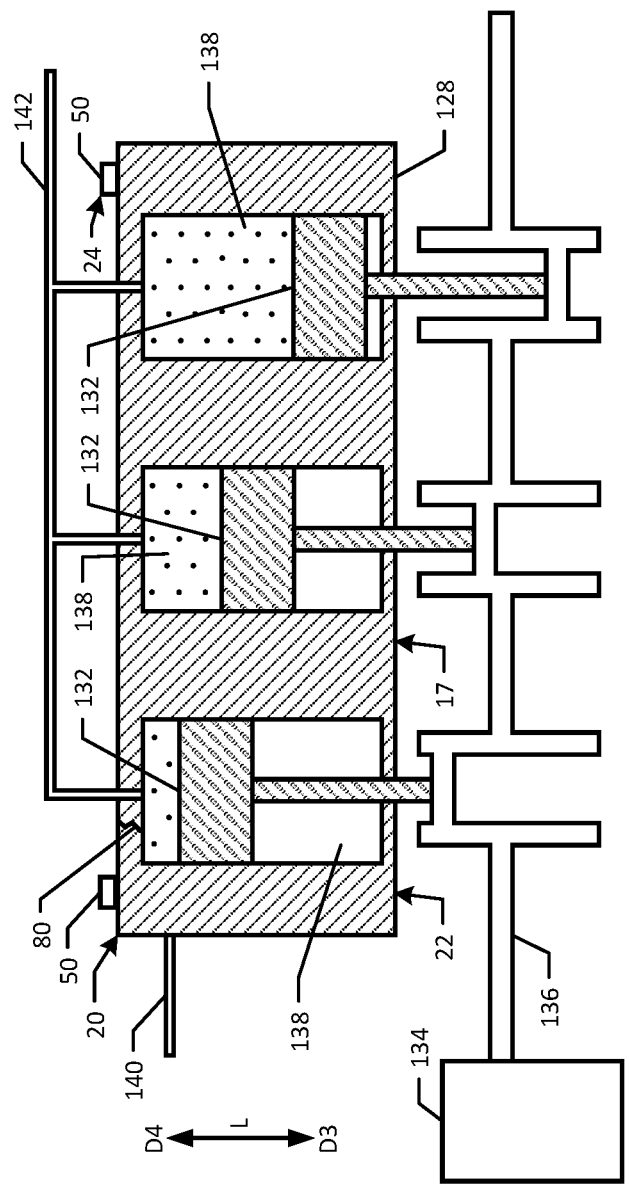
FIG. 3 is a side, cross-sectional view of a high pressure system with acoustic emission monitoring, according to one embodiment.
Figure 4:
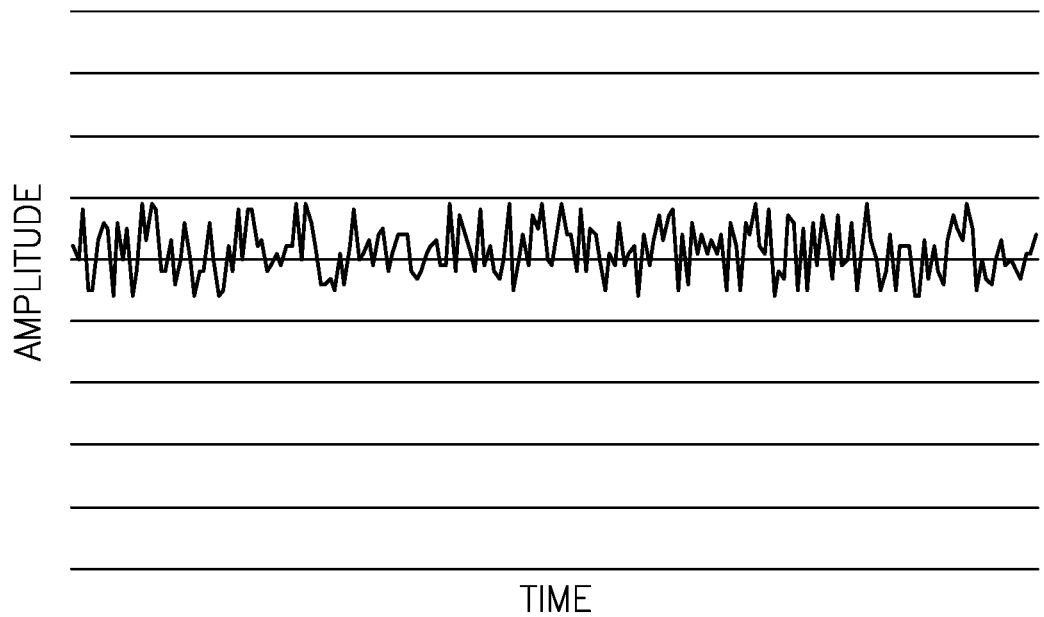
FIG. 4 is an acoustic emission profile of a high pressure system prior to formation of a defect within the high pressure system, according to one embodiment.

Referring to FIGS. 1 to 3, a high pressure system 20 can include a high pressure assembly 22 and an acoustic emission monitoring assembly 24. The high pressure assembly 22 can include one or more components that, in operation, produce and/or transport high pressure mediums (such as liquids or gases). The term "high pressure" as used herein refers to pressures sufficient for, according to one embodiment, use in a waterjet cutting assembly. For example, the term high pressure can include pressures of 15,000 psi or greater. The term high pressure, as used herein, also includes ultra-high pressure, for example pressures of 40,000 psi or greater. The term high pressure, as used herein, also includes hyper pressure, for example pressures of 75,000 psi or greater.

As shown in FIGS. 1 and 2, the high pressure assembly 22 can include a high pressure intensifier 26, which generates a high pressure fluid output, for example water with a pressure of at least 15,000 psi, for use in a high pressure application, such as the formation of a waterjet to be used in a cutting assembly. As shown in FIG. 3, the high pressure assembly 22 can include a direct drive pump 17. According to one embodiment, the high pressure assembly 22 can include pipes, tubing, fittings, valves, etc.

Referring to FIGS. 1 and 2, the high pressure intensifier 26 can include a drive chamber 28, a high pressure chamber 30, and a plunger 32. The plunger 32 can include a first surface 34 with a first surface area, and a second surface 36 with a second surface area that is smaller than the first surface area. According to one embodiment, the first surface 34 and the second surface 36 are parallel and face in opposite directions from one another.

The drive chamber 28 defines a drive chamber interior space 38, which as shown can enclose the first surface 34 of the plunger 32 such that the first surface 34 is translatable within the drive chamber interior space 38, translatable relative to the drive chamber 28, and translatable along a longitudinal direction L. As shown in the illustrated embodiment, the longitudinal direction L can be normal to the first surface 34. According to one embodiment, the drive chamber 28 is in the shape of a cylinder.

The high pressure chamber 30 defines a high pressure chamber interior space 40, which as shown can enclose the second surface 36 of the plunger 32 such that the second surface 36 is translatable within the high pressure chamber interior space 40, translatable relative to the high pressure chamber 30, and translatable along the longitudinal direction L. According to one embodiment, the high pressure chamber 30 is in the shape of a cylinder.

As shown in the illustrated embodiment, the intensifier 26 can further include an end bell assembly 42 coupling the drive chamber 28 to the high pressure chamber 30. According to one aspect of the disclosure, the intensifier 26 can include an end cap assembly 48 coupled to the high pressure chamber 30 opposite the end bell assembly 42 with respect to the longitudinal direction L. The end bell assembly 42 can define a housing to support a check valve (not shown) or other components of the high pressure assembly 22.

In operation, a drive fluid, also referred to herein as a low pressure fluid 44, (for example hydraulic oil) enters the drive chamber interior space 38. Pressure of the low pressure fluid 44 is increased, for example to about 3,000 psi, and presses against the first surface 34 of the plunger 32 thereby moving the plunger in a first direction D1 that makes up one component of the longitudinal direction L, for example to the left as shown in FIG. 2.

A high pressure fluid 46, for example water, enters the high pressure chamber interior space 40 prior to movement of the plunger 32 in the first direction D1. As the plunger 32 moves in the first direction D1, the second surface 36 also moves in that same direction thereby increasing pressure of the high pressure fluid 46.

Due to the relatively larger surface area of the first surface 34 compared to the surface area of the second surface 36, movement of the plunger 32 in the first direction D1 raises the pressure of the high pressure fluid 46 within the high pressure chamber interior space 40 above that of the low pressure fluid 44 within the drive chamber interior chamber 38. For example, the high pressure fluid 46 can be pressurized to at least 15,000 psi according to one aspect of the disclosure. According to another aspect of the disclosure, the high pressure fluid 46 can be pressurized to at least 40,000 psi. According to another aspect of the disclosure, the high pressure fluid 46 can be pressurized to at least 75,000 psi. The pressurized high pressure fluid 46 can then be released from the high pressure chamber interior space 40 for use in a high pressure application, such as a waterjet cutter.

According to one embodiment of the disclosure, the intensifier 26 can be a single-acting system with one high pressure fluid chamber 30 such that the intensifier 26 only outputs the pressurized high pressure fluid 46 when the plunger 32 moves in the first direction D1. However, as shown in FIGS. 1 and 2, the intensifier 26 can be a double-acting system with a second high pressure chamber 30' positioned opposite the first high pressure chamber 30 such that the drive chamber 28 is positioned between the first high pressure chamber 30 and the second high pressure chamber 30' with respect to the longitudinal direction L.

According to one embodiment, the second high pressure chamber 30' can include a number of the elements described in reference to the first high pressure chamber 30, for example the second high pressure chamber 30' can be identical to the first high pressure chamber 30. As shown, the plunger 32 can include a third surface 35 with a third surface area, and a fourth surface 37 with a fourth surface area that is smaller than the third surface area. According to one embodiment, the first surface 34 and the third surface 35 are equal in size, parallel, and face in opposite directions from one another (for example the third surface 35 can face in the first direction D1 and the first surface 34 can face in a second direction D2 which is opposite the first direction D1 and is the other component that makes up the longitudinal direction L).

The drive chamber interior space 38 can enclose both the first surface 34 of the plunger 32 and the third surface 35 of the plunger 32 such that the first surface 34 and the third surface 35 are translatable within the drive chamber interior space 38, relative to the drive chamber 28, and along the longitudinal direction L.

In operation, as the plunger 32 moves in the first direction D1, for example to the left as shown in FIG. 2, the high pressure fluid 46 enters, for example through an inlet 41, the high pressure chamber interior space 40 of the second high pressure chamber 30'. The low pressure fluid 44 enters the drive chamber interior space 38, for example through an inlet 43 on the side of the drive chamber interior space 38 that faces the third surface 35. Pressure of the low pressure fluid 44 is increased, for example by a pump 45, and presses against the third surface 34 of the plunger 32 thereby moving the plunger in the second direction D2, for example to the right as shown in FIG. 2. As the plunger 32 moves in the second direction D2 the high pressure fluid 46 enters, for example through an inlet 47, the high pressure chamber interior space 40 of the first high pressure chamber 30. Once movement of the plunger 32 in the second direction D2 is complete, the low pressure fluid 44 enters the drive chamber interior space 38, for example through an inlet 49 on the side of the drive chamber interior space 38 that faces the first surface 34 and the cycle repeats.

Referring to FIG. 3, the direct drive pump 17 can include a drive chamber 128 and a plurality of pistons 132, for example at least three pistons 132. The drive chamber 128 defines a drive chamber interior space 138, for example with a respective portion for each of the plurality of pistons 132. As shown each of the respective portions of the drive chamber interior space 138 can enclose a respective one of the plurality of pistons 132 such that each of the plurality of pistons 132 is translatable within the respective portion of the drive chamber interior space 138 along a longitudinal direction L.

As shown in the illustrated embodiment, the direct drive pump 17 can further include a motor 134 and a shaft 136, for example a cam shaft, coupled to the motor 134 such that output from the motor 134 rotates the shaft 136. Each of the plurality of pistons 132 can be attached to the shaft 136 such that as the shaft 136 rotates the plurality of pistons 132 translate within the drive chamber interior space 138. The plurality of pistons 132 can be arranged such that at least some of the plurality of pistons 132 are at offset positions within the drive chamber interior space 138. This offset positioning enables a constant flow of high pressure water to be supplied by the direct drive pump 17.

In operation fluid, for example water, is supplied to the direct drive pump 17 by an inlet 140. As the motor 134 rotates the shaft 136 the plurality of pistons 132 reciprocate along the longitudinal direction L. During an intake stroke, for example in a third direction D3, fluid fills a portion of the drive chamber interior space 138, and during a compression stroke, for example in a fourth direction D4, the fluid in the portion of the drive chamber interior space 138 is pressurized and output alone an outlet 142, for example to be supplied to a waterjet cutter. The positioning of the plurality of pistons 132 preferably ensures that at least one of the plurality of pistons 132 is always performing its compression stroke, thereby resulting in a constant output of high pressure fluid from the direct drive pump 17, for example to the outlet 142.

Referring to FIGS. 1 to 3, the acoustic emission monitoring assembly 24 can include at least one acoustic sensor 50 (referred to herein as "the sensor 50") attached to the high pressure assembly 22, for example to at least one of the drive chamber 28, the high pressure chamber 30, the end bell assembly 42, and the drive chamber 128. Each of the components of the high pressure assembly 22 can include zero, one, or more than one of the acoustic sensors 50. The acoustic sensor 50 can be positioned on an exterior surface of the high pressure assembly 22, for example a surface that has direct line-of-sight to a point within an environment surrounding the high pressure system 20. For example, the acoustic sensor 50 can be attached to an outer surface 52 of the high pressure chamber 30, wherein the outer surface 52 is opposite an inner surface 54 of the high pressure chamber 30, the inner surface 54 defining the high pressure chamber interior space 40.

According to one embodiment, one or more of the acoustic sensors 50 can be attached to an internal surface of the high pressure assembly 22, for example a surface that has no direct line-of-sight to a point within the environment surrounding the high pressure system 20. According to one embodiment, the acoustic sensor 50 can be attached to the high pressure assembly 22 such that the acoustic sensor is hidden from view. While such a placement for the one or more acoustic sensors 50 may result in additional challenges related to connection to and use of the one or more acoustic sensors 50, the hidden placement may also protect the one or more acoustic sensors 50 from damage.

The one or more acoustic sensors 50 can include an acoustic sensor 50' attached to the high pressure assembly 22 at a location that is between two components of the high pressure assembly 22, for example between a surface of the high pressure chamber 30 and the end bell assembly 42. According to one embodiment, the one or more acoustic sensors 50 can include an acoustic sensor 50" embedded within one or more of the components of the high pressure assembly 22, for example within the first high pressure chamber 30, such that the acoustic sensor 50 is completely surrounded by the first high pressure chamber 30.

Damage mechanisms, also referred to herein as defects, exhibited by a component of a mechanical system generate some form of acoustic emission. According to one embodiment, an acoustic emission is a deformation wave that travels through the bulk material of the component being monitored. For example, formation or growth of a defect 80, such as a crack, in a component of the high pressure assembly 22 releases energy in the form of a deformation wave which propagates through the bulk material which makes up the component. The acoustic emission monitoring assembly 24 detects this wave.

The acoustic sensors 50 can include piezoelectric materials that create a voltage when vibrated, for example by the deformation waves produced by the defect 80. The sensors 50 can be connected to a signal processing unit, for example a computer 82, for signal processing. According to one embodiment, the acoustic emission monitoring assembly 24 can include a pre-amplifier (not shown) connected between the sensor 50 and the computer 82. The processed signals can then be output for analysis.

Referring to FIGS. 1 to 8, the high pressure assembly 22 can produce various acoustic emissions as a result of various conditions of the high pressure assembly 22. For example, a "healthy" system, operating within expected parameters and devoid of any defects, can produce a first acoustic emission profile as shown in FIG. 3. The steady state nature of the operation of the high pressure assembly 22 results in a relative calm, consistent acoustic emission profile.

Figure 5:
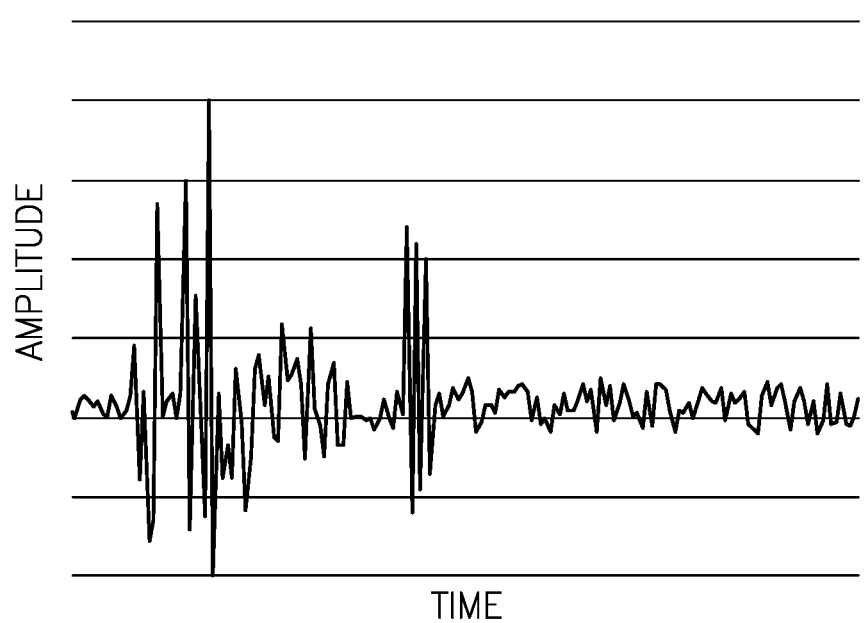
FIG. 5 is an acoustic emission profile of a high pressure system during one type of defect within the high pressure system, according to one embodiment.
Figure 6:
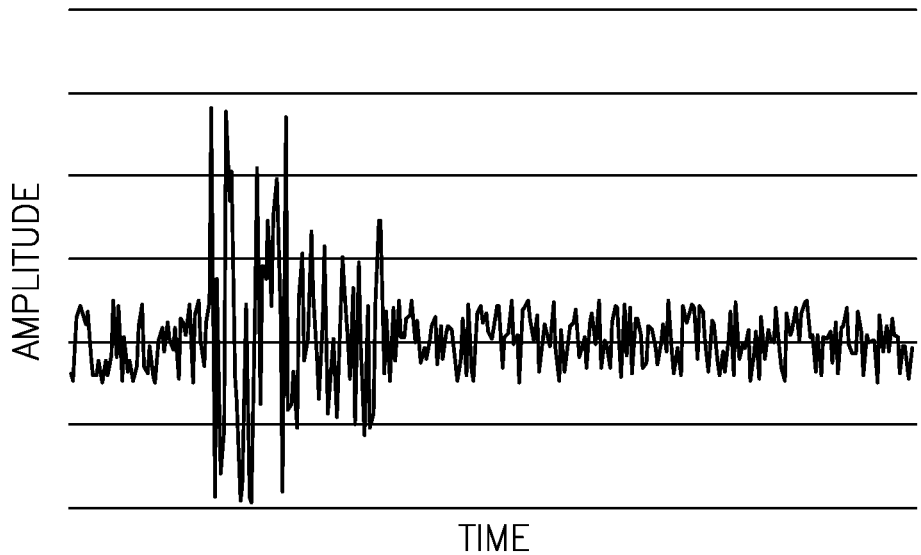
FIG. 6 is an acoustic emission profile of a high pressure system during another type of defect within the high pressure system, according to one embodiment.
Figure 7:
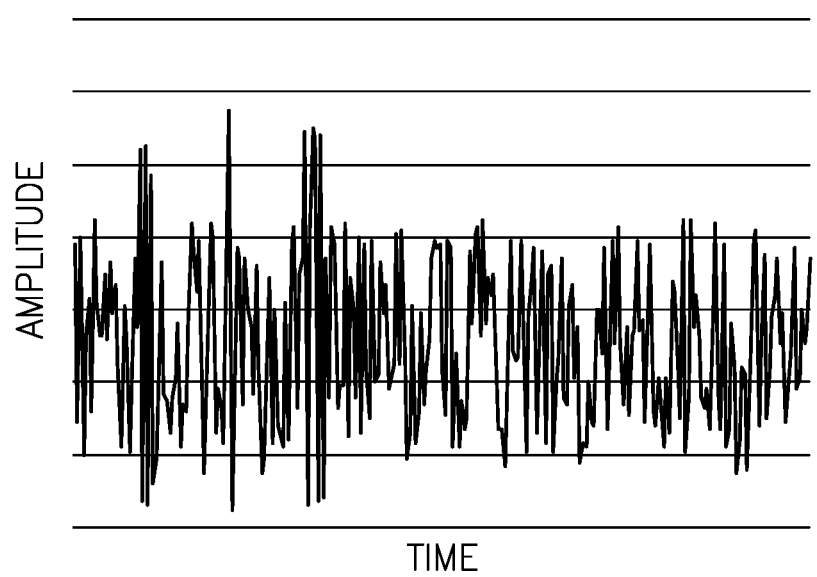
FIG. 7 is an acoustic emission profile of a high pressure system during another type of defect within the high pressure system, according to one embodiment.
Figure 8:
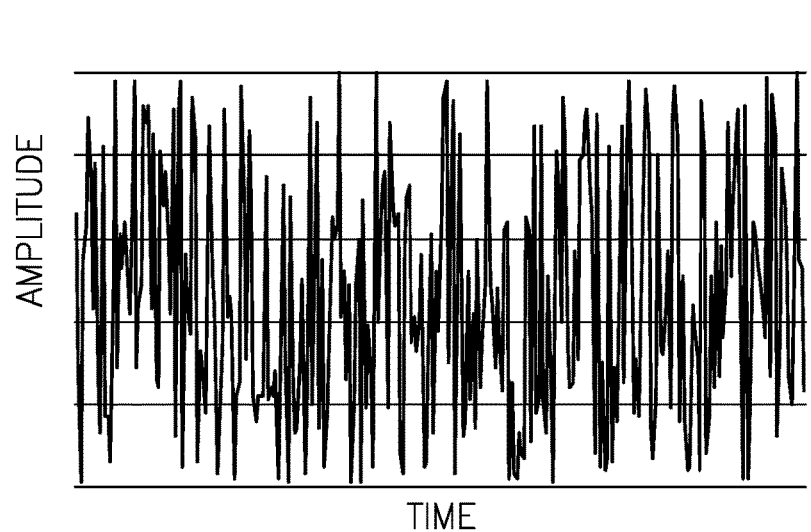
FIG. 8 is an acoustic emission profile of a high pressure system during another type of defect within the high pressure system, according to one embodiment.
Figure 9:
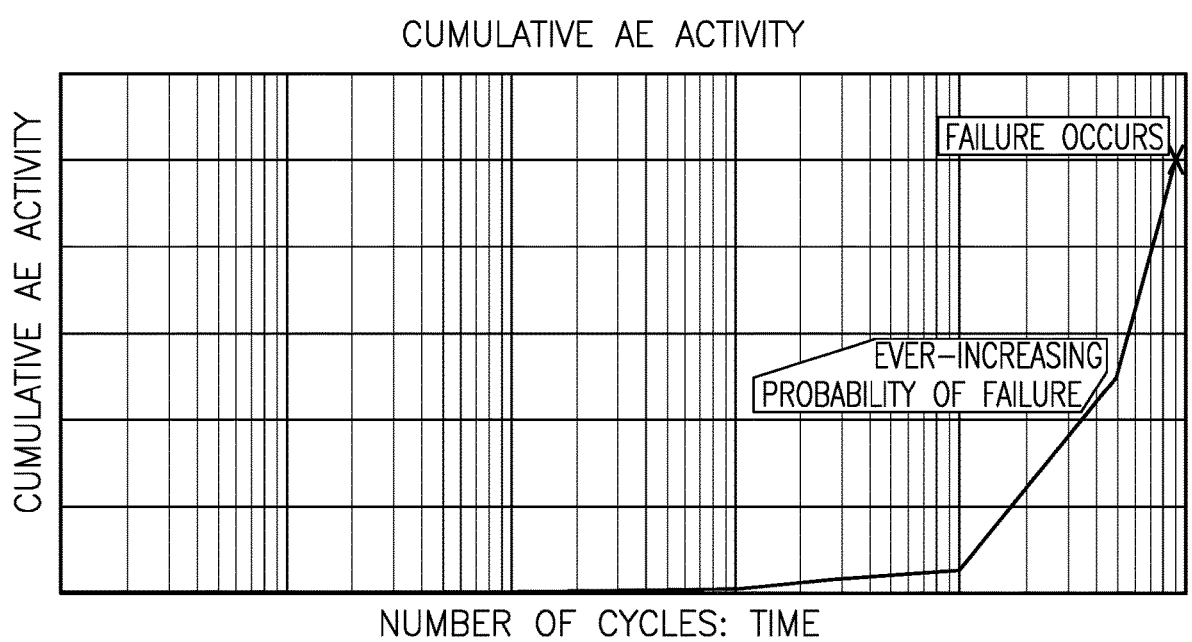
FIG. 9 is a plot of cumulative acoustic emission activity over an amount of time.

According to one example, various types of defects forming or growing within the high pressure assembly 22 can each result in various acoustic emission profiles with different characteristics. As shown in FIG. 5, an impact experienced by the high pressure assembly 22 can result in a primary spike and a secondary spike in the acoustic emission profile. As shown in FIG. 6, a crack formation or growth in the high pressure assembly 22 can result in larger, more sustained spike, relative to the impact acoustic emission profile, in the acoustic emission profile. As shown in FIG. 7, fretting (excess mechanical wear) in the high pressure assembly 22 can result in a series of spikes in the acoustic emission profile. As shown in FIG. 8, a leak in the high pressure assembly 22 can result in a "noisy" acoustic emission profile with a higher amplitude relative to the "healthy" system. Various types of sensors 50 can be selected for use based on the types of defects 80 expected.

Referring to FIGS. 1 to 3 and 9, as the defect 80, for example a fatigue crack, grows in a component of the high pressure assembly 22, for example the high pressure chamber 30, a deformation wave is produced and travels through the bulk material of the high pressure chamber 30. The acoustic sensor 50 detects this wave and "sends" the wave's raw signal to the computer 82. The computer 82 filters and turns the raw signal into something that can be used for further data analysis. The final, processed signal can be referred to as a "hit." Various parameters of each hit can be calculated, such as amplitude, duration, energy, frequency, etc., which can then be correlated to an intensity of the damage occurring as a result of the defect 80.

By keeping track of the total number of hits over time, the probability of imminent failure of the high pressure assembly 22 can be assessed and communicated to an end user of the high pressure system 20. As shown schematically in the figure, towards the beginning of a component's life, there is or should be a low number of "hits". As the component gets closer to failure (i.e. the defect 80 in the high pressure chamber 30 gets larger), more "hits" are detected by the sensor 50 and tallied. The acoustic emission monitoring assembly 24 can plot the number of "hits" over time to produce, according to one embodiment, an exponential curve. Comparing the plot to historical data about the component with the defect allows imminent failure of the component to be predicted. According to one embodiment, the acoustic emission monitoring assembly 24, for example the computer 82, performs the comparison and predictions mentioned above. The results of the comparison and predictions can be output, for example on a screen of the computer 82, such that the results are viewable by an end user.

It will be understood by those skilled in the art that the signal processing, data output, data analysis, data comparison, and predictions, can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more of the computer 82 (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

According to one embodiment, the computer 82 includes at least one computer readable medium storing logic or information to the signal processing, data output, data analysis, data comparison, predictions, or any combination thereof as described herein.

Referring to FIGS. 1 to 9, a method of operating the high pressure system 20 includes detecting at least one acoustic emission (referred to herein as "the acoustic emission") generated by the defect 80, for example formation or growth of the defect 80, in a component of the high pressure assembly 22. The acoustic emission can be detected by one of the acoustic sensors 50 attached to the high pressure assembly 22. The method can further include processing a signal sent from the acoustic sensor 50 in response to the acoustic emission thereby generating a processed signal. The method can further include analyzing the processed signal, and predicting failure of the high pressure system 20 based at least in part on the analysis of the processed signal.

According to one aspect of the disclosure, analyzing the processed signal can include identifying the defect 80 that generated the acoustic emission. For example identifying the defect 80 can include identifying whether the defect 80 is a crack, leak, fretting, or due to an impact. Analyzing the processed signal can include tracking a total number of acoustic emissions during a period of time. Predicting failure of the high pressure system can include comparing the total number of acoustic emissions to an expected number of acoustic emissions that results in failure of the high pressure system.

According to one embodiment, the acoustic sensor 50 is a first acoustic sensor, and the acoustic emission is detected by the first acoustic sensor attached to the high pressure assembly 22 and the acoustic emission is detected by a second acoustic sensor attached to the high pressure assembly 22. The first acoustic sensor can be attached to a first component of the high pressure assembly 22, and the second acoustic sensor can be attached to a second component of the high pressure assembly 22 that is different than the first component.

Analyzing the processed signal can include calculating a time gap between when the acoustic emission is detected by the first acoustic sensor and when the acoustic emission is detected by the second acoustic sensor. According to one embodiment, when the first acoustic sensor 50 detects the acoustic emission caused by a defect, the first acoustic sensor 50 sends a corresponding signal to the computer 82. The computer 82 records the time of the signal sent from the first acoustic sensor 50. Later, when the second acoustic sensor 50 detects the acoustic emission caused by the defect, the second acoustic sensor 50 sends a corresponding signal to the computer 82. The computer 82 records the time of the signal sent from the second acoustic sensor 50. The computer 82 then compares the difference in time between the two signals and calculates the time gap.

The method can further include estimating a location of the defect based on the positions of the first and second acoustic sensors and the time gap. For example, if the time gap is zero, the computer 82 may estimate the location of the defect is equidistant between the first acoustic sensor 50 and the second acoustic sensor 50. As another example, if the time gap is positive (the signal from the first acoustic sensor 50 was received by the computer 82 first), the computer 82 may estimate the location of the defect is closer to the first acoustic sensor 50 and farther from the second acoustic sensor 50.

The computer 82 may factor in differences in material properties for the components of the high pressure assembly 22 to which the acoustic sensors 50 are attached. For example, if the first acoustic sensor 50 is attached to a thicker material, or a material which dampens sound waves compared to the material to which the second acoustic sensor 50 is attached, a time gap of zero may result in the computer 82 estimating a location of the defect that is closer to the first acoustic sensor 50 and farther from the second acoustic sensor 50.

The first acoustic sensor can be attached to a first component of the high pressure system, and the estimated location of the defect coincides with a second component of the high pressure system. The first component can be a pressure vessel, for example one of the drive chamber 28 and the high pressure chamber 30, capable of withstanding internal pressures of greater than 2,000 psi. The second component can be an end cap abutting the pressure vessel.

According to one embodiment, the first acoustic sensor can be attached to a first component of the high pressure system, and the estimated location of the defect coincides with a second component of the high pressure system. Analyzing the processed signal can include identifying one or more of a length, an amplitude, and a frequency of the processed signal. The method can further include attaching the acoustic sensor 50 to the high pressure assembly 22.

A method of performing maintenance on the high pressure system 20 can include detecting a first acoustic emission generated by the high pressure assembly 22 at a first time, processing the first acoustic emission to establish a baseline, subsequent to detecting the first acoustic emission, detecting a second acoustic emission generated by the high pressure system at a second time, processing the second acoustic emission to establish a current data set, and comparing the baseline to the current data set to determine if a defect 80 occurred in the high pressure system 20 between the first time and the second time.

According to one embodiment, the first acoustic emission and the second acoustic emission are detected by the acoustic sensors 50. The method can further include attaching the acoustic sensor 50 to at least one component of the high pressure assembly 22. The acoustic sensor 50 can include a first acoustic sensor and a second acoustic sensor, and the method can further include estimating a location of the defect based, in part, on the positions of the first and second acoustic sensors. The method can further include analyzing the current data set thereby identifying at least one characteristic of the defect 80 such as the type of defect.

According to one embodiment, the high pressure system 20 includes the plunger 32 having the first surface 34 with the first surface area, and the second surface 36 with a second surface area that is smaller than the first surface area. The high pressure system 20 further includes the drive chamber 28 enclosing the plunger 32 such that the first surface 34 is translatable within the drive chamber 28, relative to the drive chamber 28, and along the longitudinal direction L, which is normal to the first surface 34.

The high pressure system 20 includes the high pressure chamber 30 enclosing the plunger 32 such that the second surface 36 is translatable within the high pressure chamber 30, relative to the high pressure chamber 30, and along the longitudinal direction L. The high pressure chamber can include a first end and a second end, the second end opposite the first end with respect to the longitudinal direction L. The high pressure system 20 can include an end bell assembly 42 coupling the first end of the high pressure chamber 30 to the drive chamber 28. According to one embodiment, the acoustic sensors 50 is attached to at least one of the drive chamber 28, the high pressure chamber 30, and the end bell assembly 42.

The acoustic sensors 50 can be attached to the high pressure system 20 such that the acoustic sensor 50 is hidden from view from any viewpoint in an environment surrounding the high pressure system 20. The high pressure chamber 30 can be a first high pressure chamber, and the high pressure system 20 can further include the second high pressure chamber 30' enclosing the plunger 32 such that the fourth surface 37 of the plunger 32 is translatable within the second high pressure chamber 30', relative to the second high pressure chamber 30', and along the longitudinal direction L. The fourth surface can define a surface area equal to the surface area of the second surface 36. The drive chamber 28 can be positioned between the first high pressure chamber 30 and the second high pressure chamber 30', a first of the acoustic sensors 50 can be attached to the first high pressure chamber 30, and a second of the acoustic sensors 50 can be attached to the second high pressure chamber 30'.

The drive chamber 28, according to one embodiment, is a pressure vessel capable of withstanding internal pressures of at least 2,000 psi, the first high pressure chamber 30 is a pressure vessel capable of withstanding internal pressures of greater than 40,000 psi, and the second high pressure chamber 30' is a pressure vessel capable of withstanding internal pressures of greater than 40,000 psi.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A high pressure system comprising:
a plunger having a first surface with a first surface area, and a second surface with a second surface area that is smaller than the first surface area;
a drive chamber enclosing a first portion of the plunger such that the first surface is translatable within the drive chamber, relative to the drive chamber, and along a first direction;
a high pressure chamber capable of withstanding internal pressures of at least 40,000 psi, the high pressure chamber enclosing a second portion of the plunger such that the second surface is translatable within the high pressure chamber, relative to the high pressure chamber, and along the first direction, the high pressure chamber including a first end and a second end, the second end opposite the first end;
an end bell assembly coupling the first end of the high pressure chamber to the drive chamber;
at least one acoustic sensor positioned within the high pressure chamber.

2. The high pressure system of claim 1 wherein the first surface is planar, and the first direction is normal to the first surface.

3. The high pressure system of claim 1 wherein the at least one acoustic sensor is hidden from view from any viewpoint in an environment surrounding the high pressure system.

4. The high pressure system of claim 1, wherein the high pressure chamber is a first high pressure chamber, the high pressure system further comprising:
a second high pressure chamber enclosing a third portion of the plunger such that a third surface of the plunger is translatable within the second high pressure chamber, relative to the second high pressure chamber, and along the first direction.

5. The high pressure system of claim 4 wherein the third surface includes a third surface area that is equal to the second surface area.

6. The high pressure system of claim 4 wherein the at least one acoustic sensor includes at least two acoustic sensors, the drive chamber is positioned between the first high pressure chamber and the second high pressure chamber, a first of the at least two acoustic sensors is positioned within the first high pressure chamber, and a second of the at least two acoustic sensors is positioned within the second high pressure chamber.

7. The high pressure system of claim 4 wherein the drive chamber is a pressure vessel capable of withstanding internal pressures of greater than 2,000 psi.

8. The high pressure system of claim 1 wherein the at least one acoustic sensor generates a signal in response to a detected acoustic emission, the acoustic emission being generated as a result of a defect forming within a component of the high pressure system.

9. The high pressure system of claim 8, further comprising:
a signal processing unit that analyzes the signal generated by the at least one acoustic sensor and identifies at least one characteristic of the defect that generated the acoustic emission.

10. The high pressure system of claim 9 wherein the at least one characteristic of the defect that generated the acoustic emission includes: a type of the defect; a size of the defect; a change in the size of the defect; a location of the defect; and any combination thereof.

11. The high pressure system of claim 9 wherein the at least one acoustic sensor includes a first acoustic sensor and a second acoustic sensor, the signal processing unit analyzes signals generated by both the first acoustic sensor and the second acoustic sensor in response to a detected acoustic emission within the high pressure system, and the signal processing unit calculates a time gap between when the first acoustic sensor generates a signal in response to the detected acoustic emission and when the second acoustic sensor generates a signal in response to the detected acoustic emission, and the signal processing unit estimates a location of the defect based on relative positions of the first acoustic sensor and the second acoustic sensor and based on the time gap.

12. A high pressure system comprising:
   a plunger having a first surface with a first surface area, and a second surface with a second surface area that is smaller than the first surface area;
   a drive chamber enclosing a first portion of the plunger such that the first surface is translatable within the drive chamber, relative to the drive chamber, and along a first direction;
   a high pressure chamber enclosing a second portion of the plunger such that the second surface is translatable within the high pressure chamber, relative to the high pressure chamber, and along the first direction, the high pressure chamber including a first end and a second end, the second end opposite the first end;
   an end bell assembly coupling the first end of the high pressure chamber to the drive chamber;
   a first acoustic sensor attached to the drive chamber, the high pressure chamber, or the end bell assembly;
   a second acoustic sensor attached to the drive chamber, the high pressure chamber, or the end bell assembly,
   wherein the first acoustic sensor and the second acoustic sensor are attached to different components of the high pressure system.

13. The high pressure system of claim 12 wherein the first acoustic sensor is attached to the high pressure system such that the first acoustic sensor is hidden from view from any viewpoint in an environment surrounding the high pressure system, and the second acoustic sensor is attached to the high pressure system such that the second acoustic sensor is hidden from view from any viewpoint in an environment surrounding the high pressure system.

14. The high pressure system of claim 12, wherein the high pressure chamber is a first high pressure chamber, the high pressure system further comprising:
   a second high pressure chamber enclosing a third portion of the plunger such that a third surface of the plunger is translatable within the second high pressure chamber, relative to the second high pressure chamber, and along the first direction.

15. The high pressure system of claim 14 wherein the drive chamber is positioned between the first high pressure chamber and the second high pressure chamber, the first acoustic sensor is attached to the first high pressure chamber, the high pressure system further comprising a third acoustic sensor attached to the second high pressure chamber.

16. The high pressure system of claim 14 wherein the drive chamber is a pressure vessel capable of withstanding internal pressures of greater than 2,000 psi, the first high pressure chamber is a pressure vessel capable of withstanding internal pressures of greater than 30,000 psi, and the second high pressure chamber is a pressure vessel capable of withstanding internal pressures of greater than 30,000 psi.

17. The high pressure system of claim 12 wherein both the first acoustic sensor and the second acoustic sensor generate a respective signal in response to a detected acoustic emission, the acoustic emission being generated as a result of a defect forming within a component of the high pressure system.

18. The high pressure system of claim 17, further comprising:
   a signal processing unit that analyzes the signal generated by the first acoustic sensor and the second acoustic sensor, wherein the signal processing unit identifies at least one characteristic of the defect that generated the acoustic emission.

19. The high pressure system of claim 18 wherein the at least one characteristic of the defect that generated the acoustic emission includes: a type of the defect; a size of the defect; a change in the size of the defect; a location of the defect; and any combination thereof.

20. The high pressure system of claim 19 wherein the signal processing unit analyzes signals generated by both the first acoustic sensor and the second acoustic sensor in response to a detected acoustic emission within the high pressure system, and the signal processing unit calculates a time gap between when the first acoustic sensor generates a signal in response to the detected acoustic emission and when the second acoustic sensor generates a signal in response to the detected acoustic emission, and the signal processing unit estimates a location of the defect based on relative positions of the first acoustic sensor and the second acoustic sensor and based on the time gap.

* * * * *